May 24, 1932.    E. GIEBE ET AL    1,860,145
PIEZO ELECTRIC INDICATOR
Filed Nov. 6, 1926
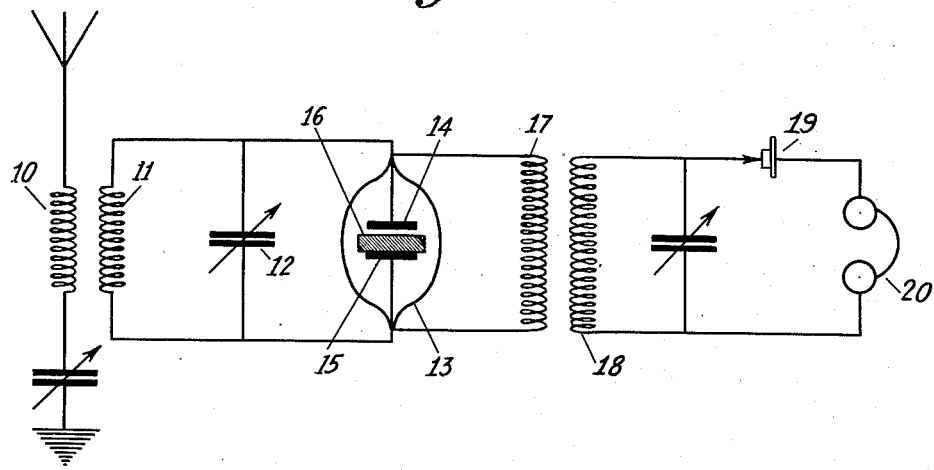
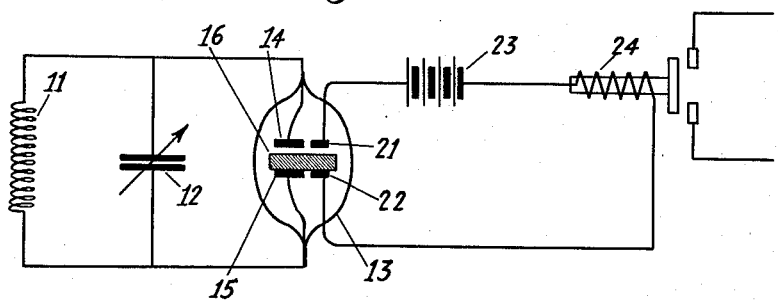
INVENTOR
ERICH GIEBE
ADOLF SCHEIBE
BY
ATTORNEY Patented May 24, 1932

1,860,145

UNITED STATES PATENT OFFICE

ERICH GIEBE AND ADOLF SCHEIBE, OF CHARLOTTENBURG, NEAR BERLIN, GERMANY, ASSIGNORS TO RADIO CORPORATION OF AMERICA, A CORPORATION OF DELAWARE

PIEZO-ELECTRIC INDICATOR

Application filed November 6, 1926, Serial No. 146,596, and in Germany November 7, 1925.

This invention relates to the piezo-electric art and deals more particularly with the use of a piezo-electric device to obtain certain audible and visual phenomena in radio communication.

It is an object of this invention to provide a piezo-electric device for indicating visually and audibly the phenomenon of resonance between two circuits.

It is a further object of this invention to employ a piezo-electric device for indicating visually and audibly the reception of a radio communication.

Further it is an object of this invention to utilize the piezo-electric device as a frequency indicator in radio communication.

It is a further object of this invention to provide a piezo-electric device which is designed to instigate the discharge of alternating or direct current potentials.

It is a further object of this invention to provide a highly sensitive piezo-electric relay.

In our United States Patent 1,685,810 of October 2, 1928, for method of an apparatus for rendering visible oscillations of piezo-electric crystals, there is disclosed a method and apparatus for rendering the oscillations of a piezo-electric crystal visible. It has been found that when the frequency of electrical potential applied to the opposite plates of a piezo-electric device is substantially in resonance with the frequency of mechanical vibration of the crystal, the piezo-electric potentials generated by the vibration of the crystal causes a luminous discharge between the crystal and plates, and this discharge has its maximum intensity at the point or points where the amplitude of mechanical vibration of the crystal is greatest.

In carrying out this invention this phenomenon is made use of to visually indicate resonance between certain electrical oscillations and the mechanical vibrations of the crystal. This affords a ready and convenient means of visually indicating the signal impulses of a radio telegraph communication, similar to the well known blinker method of communication. As the signal impulses of the proper frequency are received, the high frequency potentials which they generate acting across the plates of the crystal, set the crystal into vigorous mechanical vibration, and this mechanical vibration in turn generates a corresponding alternating current potential between the plates, in accordance with the well known laws of piezo-electricity. It is this alternating current potential which produces the luminous effect. The duration of the period of luminosity corresponds sharply with the period of vibration of the crystal resulting from the received signal impulse. Thus it will be seen that a long impulse corresponding to a dash of a signal character renders a comparatively long period of luminosity; while the shorter impulse corresponding to the dot of a signal characteristic renders a comparatively short period of luminosity. The signal may be thereby read visually.

In order to obtain the phenomenon of luminosity between the plates of the piezo-electric device it has been found most desirable to mount the crystal in an evacuated vessel or in a vessel containing certain gases at reduced pressure. A tube filled with neon gas has been found to be highly desirable for this purpose.

Since the luminosity is initiated only in the presence of very exact coincidence between the frequency of the wave to be received and one of the longitudinal natural vibrations of the crystal, it is possible to obtain an extremely sharp selectivity as well as an unusually high degree of freedom from atmospherics. In order to obtain the potentials necessary for the excitation of the piezo-electric crystal it will be necessary in most cases to amplify the radio telegraphic signals picked up by the antenna. This may be done in a manner well known in the art and forms no part of the present invention.

It has been found that in addition to the phenomenon of luminosity between the plates during the vibration of the crystal, there are also produced low frequency electrical oscillations which presumably are caused by the luminous discharges. These comparatively low frequency oscillations may be used to audibly indicate the duration of the period of resonance between the signal impulse and the mechanical vibration of the crystal. Such low frequency oscillations may be detected and heard in a telephone receiver, the duration of oscillations being equal to the duration of the luminous discharge. There is thus provided audible tones in the telephone receiver which correspond to the luminous discharges between the plates of the crystal. The incoming signals may, therefore, be received both visually and audibly.

While I have described the above phenomenon in connection with a radio receiving apparatus it is to be understood that the application of this invention is not limited to such a device. For example, this apparatus may be utilized as a frequency meter. The period of mechanical vibration of the crystal may be used as a standard, and when the frequency of the electrical oscillations of the unknown source is in resonance with the mechanical vibrations of the standard crystal the above described luminous discharge and audible effect will be produced. Several units of frequency may be obtained from a single crystal by making use of its harmonics, or alternatively, more than one crystal may be mounted in the vessel, each crystal having a known period of vibration. It, therefore, follows that the frequency of an unknown source may be indicated by resonance with a vibrating crystal having a known frequency.

It has been found that, in addition to the luminous discharge and the generation of low frequency oscillations as a result thereof, there obtains further the following phenomenon. If two auxiliary electrodes are mounted on opposite sides of the crystal of the above described piezo-electric device and an alternating current or a direct current potential is applied to these auxiliary electrodes it has been found that when the crystal is at its maximum vibration the low pressure gases which surround the piezo-electric device are ionized and the potential on the auxiliary electrodes is thereby discharged, the space in between such electrodes being rendered conductive. There is thus produced a highly sensitive relay which would be responsive only to alternating current potentials of a frequency equal to the frequency of the crystal as was outlined above. By suitable selection of the value of the potential to be released, and further by choosing conveniently the piezo-electric potentials, that is, the amplitude of vibration of the crystal, and further by properly choosing the distance between the electrodes, the gas pressure etc., it is possible to modify the operation of the relay in widely varying manners. For instance, conditions may be so chosen that the relays or discharge of the auxiliary potential can be caused by a single oscillation shock or impulse causing the crystal to vibrate only for a comparatively short while, said discharge persisting after the crystal has ceased to vibrate. The conditions may also be so chosen that the discharge of the auxiliary potential persists only as long as the vibrations of the said crystal persist, and that the discharge ceases together with the vibrations of the crystal.

In the event that the action of the piezo-electric potentials at the vibrating crystal, which causes ionization in the gas should itself be inadequate for producing a luminous discharge, said discharge may be obtained in accordance with this invention by the use of an auxiliary potential at the auxiliary electrodes.

A relay of this type may be used for calling a station in wireless, high frequency telegraphy or in telephone communication. The use of a relatively great number of the crystals tuned to various natural frequencies of vibration to form relays responding only to these particular frequencies in a very selective manner, makes it possible furthermore to call various stations or receiving points simultaneously by way of the same line wires. The manner in which this invention is carried out will be apparent from the following description taken in connection with the accompanying drawings in which:

Figure 1 is a diagrammatic showing of a signal receiving system embodying the invention.

Figure 2 is a diagram of a piezo-electric relay.

Referring to the drawings 10 indicates a conventional receiving aerial to which is coupled the tuning circuit comprising the coil 11 and the variable condenser 12. The aerial 10 is merely used to conventionally show a source of high frequency oscillations, and when the present device is operating as a frequency indicator in a transmission station the device may be coupled to the output of the transmitter instead of to an aerial. 13 indicates a sealed vessel which may be made of either glass or metal and which is provided with the electrodes 14 and 15 which electrodes are connected to the tuned circuit 11 and 12. A suitably cut piezo-electric crystal 16 is placed between the electrodes 14 and 15 and may de designed to rest freely upon the plate 15. The plate 14 is spaced slightly from the crystal 16. The coil 17 is connected across the plates 14 and 15 and to this coil is coupled the tuned circuit 18. Across the terminals of the tuned circuit 18 is connected detector 19 and a telephone device 20.

The operation of the device is as follows:
High frequency electrical oscillations are transferred from the aerial 10 to the tuned circuits 11 and 12 and are impressed upon the plates 14 and 15. When the frequency of these oscillations is substantially equal to the natural period of mechanical vibration of the crystal 16, the crystal is set into vigorous mechanical vibration and reacts upon the plates 14 and 15 to produce a piezo-electric potential difference between the said plates. There is simultaneously produced a luminous effect at that portion of the crystal which has the maximum amplitude of vibration. If the crystal is vibrating at its natural period the luminous effect will be seen at the middle portion of the crystal only; whereas if the crystal is vibrating at one of its harmonics there will be more than one point of luminosity, that is, for the second harmonic there will be two and for the third harmonic three, etc. The duration of the period of luminosity is the same as the duration of the resonant vibration of the crystal.

As a result of this luminous discharge certain low frequency oscillations are generated and these oscillations are transferred from the coil 17 to the tuned circuit 18. They are detected by the device 19 and made audible in the acoustic device 20. The duration of this audible note heard in the device 20 is exactly equal to that of the luminuous discharge in the vessel 13. Thus the signal impulses which may be seen as long and short flashes in the tube 13 may be heard at 20 in the form of dots and dashes. It may be found desirable to interpose an amplifier between the detector and telephone apparatus in the well known manner.

In the modification shown in Figure 2 there is shown a piezo-electric device and container similar to that shown in Figure 1 but which is provided with the auxiliary electrodes 21 and 22 which are connected across a source of potential conventionally shown at 23, the relay 24 is also included in this circuit. There is thus obtained a highly sensitive relay which has the following operation:

When the electrical oscillations received in the circuit 11—12 are of the proper frequency they set the crystal 16 into mechanical vibration as disclosed above and due to the piezoelectric reaction of the crystal the low pressure gas in the vessel 13 is ionized in the vicinity of the electrodes 21 and 22 and the circuit of the potential source 23 is thereby rendered conductive and the relay 24 is operated.

While certain explanations of the phenomena which are involved in this invention have been given it is to be understood that these explanations are merely offered as possible theories of operation to assist in the understanding of the invention.

Having thus described our invention we desire to claim and secure by Letters Patent of the United States:

1. In a radio apparatus adapted to receive telegraphic communications, means to indicate visually the receipt of said communications, said means comprising a hermetically sealed piezo-electric device.

2. In a radio signaling system, the combition of a piezo-electric device adapted to produce a luminous effect in accordance with predetermined high frequency oscillations, the said luminuous effect producing electrical oscillations, and means to detect said last mentioned oscillations.

3. In a radio system adapted to receive telegraphic communications, means to indicate receipt of said communications, said means comprising a crystal device adapted to be stimulated electrically to vibrate mechanically and to react electrically when vibrated mechanically, the crystal of said device being constructed to produce luminous effects in the crystal structure.

4. In a radio signaling system the combination of a tuned circuit adapted to conduct alternating current of predetermined frequency, and a piezo-electric crystal device coupled to said circuit, said device being designed to vibrate in resonance with the frequency of the said circuit, the crystal being constructed and arranged to produce luminous effects in said crystal structure.

5. In a radio signaling system the combination of a tuned circuit adapted to conduct alternating current of predetermined frequency, and a piezo-electric device coupled to said circuit, said device being designed to vibrate in resonance with the frequency of the said circuit, whereby to produce a luminous discharge and an alternating current potential across said device, and means coupled to said device to detect said last mentioned alternating current.

6. A luminous oscillation indicator comprising a piezo-electric device having a standard frequency of mechanical vibration and being constructed to produce a luminous discharge in said device when an alternating current of a frequency equal to the aforesaid frequency is applied thereto.

7. A luminous oscillation indicator comprising a piezo-electric device having a standard frequency of vibration, said device being responsive only to electrical oscillations having a frequency equal to the standard frequency, said device being constructed to produce a luminous discharge in said device.

8. A luminous oscillation indicator comprising a hermetically sealed vessel, a piezo-electric crystal mounted in said vessel, a pair of electrodes associated with said crystal and adapted to react electrically upon the crystal to produce mechanical vibrations therein, and a second pair of electrodes mounted on opposite faces of the crystal and in spaced relation to each other, said crystal being adapted to render the space between said last mentioned electrodes electrically conductive.

9. A luminous oscillation indicator comprising a piezo-electric device having a standard frequency of vibration, said device being responsive only to electrical oscillations having a frequency equal to its own frequency of vibration to produce a luminous discharge and also to produce independent electrical oscillations at the device, and means to detect said last mentioned oscillations.

10. A luminous oscillation indicator comprising a piezo-electric crystal, means to react upon the crystal electrically to cause the crystal to vibrate mechanically, and a pair of spaced electrodes associated with the crystal, said electrodes having a potential difference therebetween, and said crystal being adapted to react upon the last mentioned electrodes to discharge the potential difference.

11. In an apparatus adapted to receive radio communications, means visually to indicate the receipt of said radio communications, said means comprising a piezo-electric device hermetically sealed in a container, said container being filled with an inert gas.

12. In an apparatus adapted to receive radio communications, means visually to indicate the receipt of said radio communications, said means comprising a piezo-electric device hermetically sealed in a container, said container being filled with an inert gas at a pressure less than atmospheric.

13. In an apparatus adapted to receive radio communications, means visually to indicate the receipt of said radio communications, said means comprising a piezo-electric device hermetically sealed in a container, said container being filled with Neon gas.

14. In an apparatus adapted to receive radio communications, means visually to indicate the receipt of said radio communications, said means comprising a piezo-electric device hermetically sealed in a container, said container being filled with Neon gas at a pressure less than atmospheric.

ERICH GIEBE.
ADOLF SCHEIBE.